(12) United States Patent
Nakagawa (10) Patent No.: US 9,388,863 B2
(45) Date of Patent: Jul. 12, 2016

(54) SHAFT COUPLING MECHANISM (71) Applicant: OILES CORPORATION, Tokyo (JP)

(72) Inventor: Noboru Nakagawa, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 45 days.

(21) Appl. No.: 14/395,923

(22) PCT Filed: Apr. 19, 2013

(86) PCT No.: PCT/JP2013/002667
§ 371 (c)(1),
(2) Date: Oct. 21, 2014

(87) PCT Pub. No.: WO2013/161244
PCT Pub. Date: Oct. 31, 2013

(65) Prior Publication Data
US 2015/0330459 A1 Nov. 19, 2015

(30) Foreign Application Priority Data
Apr. 23, 2012 (JP) ................................ 2012-098267

(51) Int. Cl.
*F16D 3/74* (2006.01)
*F16D 3/68* (2006.01)

(52) U.S. Cl.
CPC ............. *F16D 3/68* (2013.01); *B60G 2200/46* (2013.01); *B60G 2200/462* (2013.01); *B60G 2202/442* (2013.01); *B60G 2206/1116* (2013.01)

(58) Field of Classification Search
CPC F16D 3/68; B60G 2200/46; B60G 2200/462; B60G 2202/442; B60G 2206/1116
USPC ......................... 464/73, 75, 76, 88, 91, 93–96
See application file for complete search history.

(56) References Cited

U.S. PATENT DOCUMENTS

| 7,699,709 | B2 * | 4/2010 | Kubota | F16D 3/68 464/73 X |
| 8,616,986 | B2 * | 12/2013 | Nakagawa | B62D 5/0409 464/76 |
| 2015/0284024 | A1 * | 10/2015 | Moriyama | F16D 3/68 464/73 X |
| 2015/0298733 | A1 * | 10/2015 | Moriyama | B62D 5/0409 464/73 X |

FOREIGN PATENT DOCUMENTS

| JP | 07-197941 | 8/1995 |
| JP | 2008-167551 | 7/2008 |
| JP | 2009-014154 | 1/2009 |
| JP | 2009-233705 | 10/2009 |
| JP | 2011-137488 | 7/2011 |

OTHER PUBLICATIONS

International Search Report for PCT/JP2013/002667 mailed May 21, 2013.
English language version of the International Search Report in PCT/JP2013/002667 dated May 21, 2013.

* cited by examiner

*Primary Examiner* — Gregory Binda
(74) *Attorney, Agent, or Firm* — Nixon & Vanderhye P.C.

(57) ABSTRACT

A shaft coupling mechanism 1 includes a coupling base body 3 coupled to a rotating shaft 2; a coupling base body 5 coupled to a rotating shaft 4; a pair of rotation transmitting members 6 and 7 interposed between both coupling base bodies 3 and 5 and adapted to transmit the rotation of the rotating shaft 2 in an R direction to the rotating shaft 4 through both coupling base bodies 3 and 5; an intermediate interposed member 8 interposed between the pair of rotation transmitting members 6 and 7; and a coupling means 9 for coupling the pair of rotation transmitting members 6 and 7 to each other.

2 Claims, 6 Drawing Sheets

SHAFT COUPLING MECHANISM

This application is the U.S. national phase of International Application No. PCT/JP2013/002667 filed 19 Apr. 2013 which designated the U.S. and claims priority to Japanese Patent Application No. 2012-098267, filed 23 Apr. 2012, the entire contents of each of which are hereby incorporated by reference.

TECHNICAL FIELD

The present invention relates to a shaft coupling mechanism suitable for coupling a rotating shaft on a rotating source side and a rotating shaft on an operating side, and more particularly to a shaft coupling mechanism (coupling) suitable for coupling a rotating shaft on a rotating source side such as an electric motor and a rotating shaft on an operating side such as a feed screw mechanism in an expansion actuator for controlling the expansion and contraction of an upper link and a lower link of a vehicular suspension system so as to enhance steering stability performance by suppressing changes in camber angle or contact patch accompanying bumping and rebounding of a wheel.

BACKGROUND ART

In Patent Documents 1 and 2, for example, expansion actuators are proposed which control the expansion and contraction of the upper link and the lower link of the vehicular suspension system so as to enhance steering stability performance by suppressing changes in the camber angle or the contact patch accompanying bumping and rebounding of the wheel. Such an expansion actuator is configured by an electric motor and a feed screw mechanism having an external thread member and an internal thread member which are rotated relative to each other by the rotation of a rotating shaft of this electric motor. The rotating shaft, i.e., an output member, of the electric motor and the rotating shaft, i.e., an input member, of the feed screw mechanism are coupled to each other by a shaft coupling mechanism (coupling), and this shaft coupling mechanism has two outer bushings formed of polyacetal and one inner bushing formed of silicone rubber, each of these bushings being provided with a plurality of projections projecting radially at equal intervals from an outer periphery thereof. The rotating shaft of the electric motor and the rotating shaft of the feed screw mechanism are connected to the respective bushings by means of respective coupling base bodies provided with a plurality of axially extending projections which are disposed between projections of the respective bushings.

PRIOR ART DOCUMENTS

Patent Documents

Patent document 1: JP-A-2008-167551
Patent document 2: JP-A-2009-233705

SUMMARY OF THE INVENTION

Problems that the Invention is to Solve

Incidentally, in the expansion actuator, in a case where one rotating shaft on the electric motor side and the other rotating shaft on the feed screw mechanism side are coupled by means of a shaft coupling mechanism, the impact at the time of the reversing of an output rotating shaft of the electric motor and the brush vibration of the electric motor are transmitted to the feed screw mechanism side through the shaft coupling mechanism, with the result that the impact and vibration can possibly be transmitted to the knuckle side of the automobile suspension and/or the vehicle body side of the automobile. In order to avoid this, a proposal can be made to provide the shaft coupling mechanism with a spacer (bushing) made of such as rubber. However, if the spacer is made softer while placing emphasis on the reduction of the impact and vibration, the soft spacer is liable to undergo creep deformation, so that backlash can possibly occur in the shaft coupling mechanism due to permanent deformation of the spacer, whereas if the spacer is made hard by placing emphasis on durability, backlash does not occur contrary to the aforementioned case, but there is a possibility that the impact and vibration is transmitted to the knuckle side of the automobile suspension and/or the vehicle body side of the automobile, as described above.

In addition, in the case where each of the coupling base bodies has a base portion and a projecting portion projecting integrally in the axial direction from one axial surface of this base portion, the projecting portion of each coupling base body presses against and comes into contact with the base portion of the mating coupling base body, causing impact noise due to this pressing and contacting in the axial relative displacement of one rotating shaft with respect to the other rotating shaft. Furthermore, if such axial relative displacement occurs in the transmission of the rotation of one rotating shaft to the other rotating shaft, unpleasant frictional noise can possibly occur due to the pressing and contacting. If the axial length of the projecting portion of each coupling base body is made short to avoid such pressing and contacting, the contact area of the projecting portion of each coupling base body with respect to the respective rotation transmitting member in the direction about the axis becomes small, which can possibly result in abnormal deformation of each rotation transmitting member and deterioration of the durability.

In addition, in the expansion actuator, in the case where one rotating shaft on the electric motor side and the other rotating shaft on the feed screw mechanism side are coupled by means of the shaft coupling mechanism, it is desirable in terms of the rotation transmission efficiency to arrange the rotational axis of the one rotating shaft and the rotational axis of the other rotating shaft coaxially with each other. However, if the impact at the time of the reversing of the output rotating shaft of the electric motor and the brush vibration of the electric motor cause positional offset between the rotational axis of the one rotating shaft and the rotational axis of the other rotating shaft in a direction perpendicular to the axial direction, the aforementioned rotational transmission efficiency can possibly decline, so that, in order to avoid this, it is desirable to reliably prevent the positional offset between the rotational axis of the one rotating shaft and the rotational axis of the other rotating shaft.

The present invention has been devised in view of the above-described aspects, and its object is to provide a shaft coupling mechanism which, in long periods of use, makes backlash difficult to occur between one rotating shaft and the other rotating shaft in the direction about the axis, which is capable of reducing the transmission of the impact at the time of the reversing of the electric motor and the brush vibration of the electric motor to the knuckle side of the vehicle suspension and/or the vehicle body side of the automobile, which is capable of avoiding the contact between a distal end face of the axial projecting portion of one coupling base body and one axial surface of the base portion of the other coupling base body and the contact between a distal end face of the axial projecting portion of the other coupling base body and an axial surface of the base portion of one coupling base body, making it possible to eliminate the occurrence of collision noise in the axial relative displacement of one rotating shaft with respect to the other rotating shaft without generating unpleasant frictional noise in the transmission of the rotation of one rotating shaft to the other rotating shaft, thereby improving durability, and which is capable of reliably preventing the positional offset between the rotational axis of one rotating shaft and the rotational axis of the other rotating shaft, making it possible to eliminate the possibility of a decline in the rotation transmission efficiency.

Means for Overcoming the Problems

In an aspect, there is a shaft coupling mechanism in accordance with the present invention for coupling two rotating shafts by being disposed between the two rotating shafts so as to transmit the rotation of one rotating shaft to the other rotating shaft. The shaft coupling mechanism comprises: one coupling base body which is coupled to one rotating shaft; another coupling base body which is coupled to another rotating shaft; a pair of rotation transmitting members which are disposed between the one and the other coupling base bodies; and an intermediate interposed member which is interposed between the pair of rotation transmitting members. Each of the one and the other coupling base bodies has a first base portion and a first axial projecting portion formed integrally with the first base portion in such a manner as to project in an axial direction from one axial surface of the first base portion, the first axial projecting portion of the one coupling base body and the first axial projecting portion of the other coupling base body being disposed with an interval therebetween in a direction about an axis. One of the pair of rotation transmitting members has a second base portion interposed between the first base portions of the one and the other coupling base bodies in the axial direction, at least a pair of first radial projecting portions formed integrally on the second base portion in such a manner as to be spaced apart from each other in the direction about the axis and project radially from an outer peripheral edge of the second base portion, and a first through hole formed in a center of the second base portion, while the other one of the pair of rotation transmitting members has a third base portion interposed between the first base portions of the one and the other coupling base bodies in the axial direction, at least a pair of second radial projecting portions formed integrally on the third base portion in such a manner as to be spaced apart from each other in the direction about the axis and project radially from an outer peripheral edge of the third base portion, and in such a manner as to face the pair of first radial projecting portions in the axial direction, a second axial projecting portion formed integrally on the third base portion in such a manner as to project in the axial direction from one axial surface of the third base portion, and a third axial projecting portion formed integrally on the third base portion in such a manner as to project in the axial direction from another axial surface of the third base portion. The intermediate interposed member has a fourth base portion interposed between the second base portion and the third base portion in the axial direction, a pair of third radial projecting portions which are integrally formed on the fourth base portion in such a manner as to project radially from an outer peripheral edge of the fourth base portion and to be spaced apart from each other in the direction about the axis, are each disposed between the pair of first radial projecting portions and the pair of second radial projecting portions in the axial direction, and each have a greater width in the direction about the axis than a width of each of the pair of first radial projecting portions and the pair of second radial projecting portions, and a second through hole formed in a center of the fourth base portion. Each of the pair of third radial projecting portions has a smaller rigidity than the rigidity of the first axial projecting portion and the first and second radial projecting portions and is elastically deformable, and at least one of the one rotating shaft and the first base portion of the one coupling base body is in contact at its one axial surface with an axial surface of the second axial projecting portion, while at least one of the other rotating shaft and the first base portion of the other coupling base body is in contact at its one axial surface with an axial surface of the third axial projecting portion. The first axial projecting portion of the one coupling base body is disposed in one third radial projecting portion gap in the direction about the axis, is, at its both side surfaces in the direction about the axis, in contact with both one side surface in the direction about the axis of one third radial projecting portion and another side surface in the direction about the axis of another third radial projecting portion, extends across and beyond one axial surface of the other rotation transmitting member, and, at its axial distal end surface, opposes the one axial surface of the first base portion of the other coupling base body with a clearance therebetween, while the first axial projecting portion of the other coupling base body is disposed in another third radial projecting portion gap in the direction about the axis, is, at its both side surfaces in the direction about the axis, in contact with both another side surface in the direction about the axis of the one third radial projecting portion and one side surface in the direction about the axis of the other third radial projecting portion, extends across and beyond one axial surface of the one rotation transmitting member, and, at its axial distal end surface, opposes the one axial surface of the first base portion of the one coupling base body with a clearance therebetween. And the second axial projecting portion is passed through the first and second through holes, and an outer peripheral surface of the second axial projecting portion is in contact with an inner peripheral edge of the second base portion defining the first through hole.

According to the shaft coupling mechanism in accordance with the present invention, since the above-described configuration is provided, backlash is made difficult to occur between one rotating shaft and the other rotating shaft in the direction about the axis even in long periods of use, and it is possible to reduce the transmission of the impact at the time of the reversing of the electric motor and the brush vibration to the knuckle side of the vehicle suspension and/or the vehicle body side of the automobile. In particular, at least one of the first base portion of the one coupling base body and one rotating shaft is, at its one axial surface, in contact with an axial surface of the second axial projecting portion, while at least one of the first base portion of the other coupling base body and the other rotating shaft is, at its one axial surface, in contact with an axial surface of the third axial projecting portion. Further, the first axial projecting portion of the one coupling base body extends across and beyond one axial surface of the other rotation transmitting member, and, at its axial distal end surface, opposes the one axial surface of the first base portion of the other coupling base body with a clearance therebetween, while the first axial projecting portion of the other coupling base body extends across and beyond the one axial surface of the one rotation transmitting member, and, at its axial distal end surface, opposes the one axial surface of the first base portion of the one coupling base body with a clearance therebetween. Therefore, it is possible to avoid contact between the distal end surface of the axial projecting portion of the one coupling base body and the one axial surface of the base portion of the other coupling base body and contact between the distal end surface of the axial projecting portion of the other coupling base body and the one axial surface of the base portion of the one coupling base body. Furthermore, it is possible to allow the axial projecting portions of the one and the other coupling base bodies to be brought into contact with overall surfaces of the radial projecting portions of the pair of rotation transmitting members in the direction about the axis. Additionally, it is possible to eliminate the occurrence of collision noise in the relative axial displacement of the one rotating shaft with respect to the other rotating shaft, and unpleasant frictional noise is not generated in the transmission of the rotation of the one rotating shaft to the other rotating shaft. Furthermore, it is possible to secure, as desired, a contact area in the direction about the axis of the axial projecting portion of each coupling base body with respect to the radial projecting portion of each rotation transmitting member, and to avoid excessive elastic compressive deformation of the intermediate interposed member, thereby making it possible to improve the durability. In addition, according to the shaft coupling mechanism of the present invention, since the outer peripheral surface of the second axial projecting portion is in contact with the respective inner peripheral edges of the second and fourth base portions defining the first and second through holes, it is possible to inhibit the relative displacement of the pair of rotation transmitting members in the direction perpendicular to the axial direction, so that it is possible to reliably prevent the positional offset between the rotational axis of one rotating shaft and the rotational axis of the other rotating shaft, thereby making it possible to eliminate the possibility of a decline in the rotation transmission efficiency.

In the present invention, the pair of rotation transmitting members are preferably formed of a hard resin such as polyacetal resin, polyamide resin, or the like, but may be formed of another hard resin exhibiting rigidity, and the intermediate interposed member may be formed of a rubber elastomer such as urethane rubber, polyester elastomer, or the like.

The shaft coupling mechanism in a preferred example of the present invention further comprises coupling means for coupling the pair of rotation transmitting members to each other, and the coupling means may have a pawl portion which is integrally provided on the second base portion in such a manner as to projectingly extend from an inner peripheral edge of another axial surface of the second base portion toward the third base portion and a coupling hole which is provided on the third base portion and into which the pawl portion is inserted so as to be latched at its distal end by the third base portion. In this case, the intermediate interposed member may have a retaining projection provided integrally on the fourth base portion in such a manner as to radially extend from the inner peripheral edge of the fourth base portion defining the second through hole, and the retaining projection may be fitted in a cavity partitioned by the pawl portion of the coupling means. If the intermediate interposed member is positioned with respect to the pair of rotation transmitting members by the pawl portion of the coupling means as the retaining projection is fitted in the cavity partitioned by the pawl portion of the coupling means, the effect derived from the intermediate interposed member can be obtained uniformly with respect to the relative rotation in both directions of the two rotating shafts.

With the shaft coupling mechanism in accordance with the present invention, in order to ensure that free play does not occur in the relative initial rotation of one rotating shaft with respect to the other rotating shaft, in the relative rotation by a fixed degree or less of both rotating shafts, each of the first axial projecting portions of the one and the other coupling base bodies at its side surfaces in the direction about the axis may be in contact with side surfaces in the direction about the axis of the third radial projecting portion of the intermediate interposed member opposing the same in the direction about the axis. Meanwhile, each of the first axial projecting portions of the one and the other coupling base bodies at its side surfaces in the direction about the axis may be in non-contact with, in the relative rotation by a fixed degree or less of both rotating shafts, and may be adapted to be brought into contact with, in the relative rotation by more than a fixed degree of both rotating shafts, side surfaces in the direction about the axis of the first radial projecting portions and the second radial projecting portions of the pair of rotation transmitting members opposing the same in the axial direction. The one coupling base body may be directly coupled and secured to the one rotating shaft, but may be indirectly coupled to the one rotating shaft through another rotation transmitting mechanism such as a gear mechanism, and the same also applies to the other coupling base body as well.

The shaft coupling mechanism in accordance with the present invention may be used for a toe control actuator which serves as an expansion actuator for controlling the expansion and contraction of an upper link and a lower link of a vehicular suspension system, e.g., an expansion actuator which couples a knuckle of an automobile suspension and a vehicle body in order to enhance steering stability performance by suppressing changes in camber angle or contact patch accompanying bumping and rebounding of a wheel. In this case, one coupling base body may be coupled to a rotating shaft, i.e., an output member, of a reduction gear coupled to a rotating shaft of a brushed motor of the toe control actuator located on the vehicle body side, and the other coupling base body may be connected to a rotating shaft, i.e., an input member, of the feed screw mechanism of the toe control actuator located on the knuckle side. In addition, the shaft coupling mechanism in accordance with the present invention may be a shaft coupling mechanism for an electric power steering apparatus, in which case the one rotating shaft may be adapted to be coupled to an output rotating shaft of an electric motor, while the other rotating shaft may be adapted to be coupled to a steering shaft of an automobile.

Advantages of the Invention

According to the present invention, it is possible to provide a shaft coupling mechanism which, in long periods of use, makes backlash difficult to occur between one rotating shaft and the other rotating shaft in the direction about the axis, which is capable of reducing the transmission of the impact at the time of the reversing of the electric motor and the brush vibration of the electric motor to the knuckle side of the vehicle suspension and/or the vehicle body side of the automobile, which is capable of avoiding contact between a distal end face of the axial projecting portion of one coupling base body and one axial surface of the base portion of the other coupling base body and contact between a distal end face of the axial projecting portion of the other coupling base body and an axial surface of the base portion of one coupling base body, making it possible to eliminate the occurrence of collision noise in the axial relative displacement of one rotating shaft with respect to the other rotating shaft without generating unpleasant frictional noise in the transmission of the rotation of one rotating shaft to the other rotating shaft, thereby improving durability, and which is capable of reliably preventing the positional offset between the rotational axis of one rotating shaft and the rotational axis of the other rotating shaft, making it possible to eliminate the possibility of a decline in the rotation transmission efficiency.

MODE FOR CARRYING OUT THE INVENTION

Next, a more detailed description will be given of the mode for carrying out the invention on the basis of a preferred embodiment illustrated in the drawings. It should be noted that the present invention is not limited to this embodiment.

In FIGS. 1 to 5, a shaft coupling mechanism 1 in accordance with this embodiment is used for a toe control actuator which serves as an expansion actuator for controlling the expansion and contraction of an upper link and a lower link of a vehicular suspension system, specifically an expansion actuator which couples a knuckle of an automobile suspension and a vehicle body. The shaft coupling mechanism 1 in accordance with this embodiment is comprised of a coupling base body 3 coupled to one rotating shaft 2 on an electric motor side of the toe control actuator; a coupling base body 5 coupled to another rotating shaft 4 on a feed screw mechanism side of the toe control actuator having an external thread member and an internal thread member which are rotated relative to each other; a pair of rotation transmitting members 6 and 7 interposed between both coupling base bodies 3 and 5 and adapted to transmit the rotation of the rotating shaft 2 in an R direction to the rotating shaft 4 through both coupling base bodies 3 and 5; an intermediate interposed member 8 interposed between the pair of rotation transmitting members 6 and 7; and a coupling means 9 for coupling the pair of rotation transmitting members 6 and 7 to each other.

Figure 1:
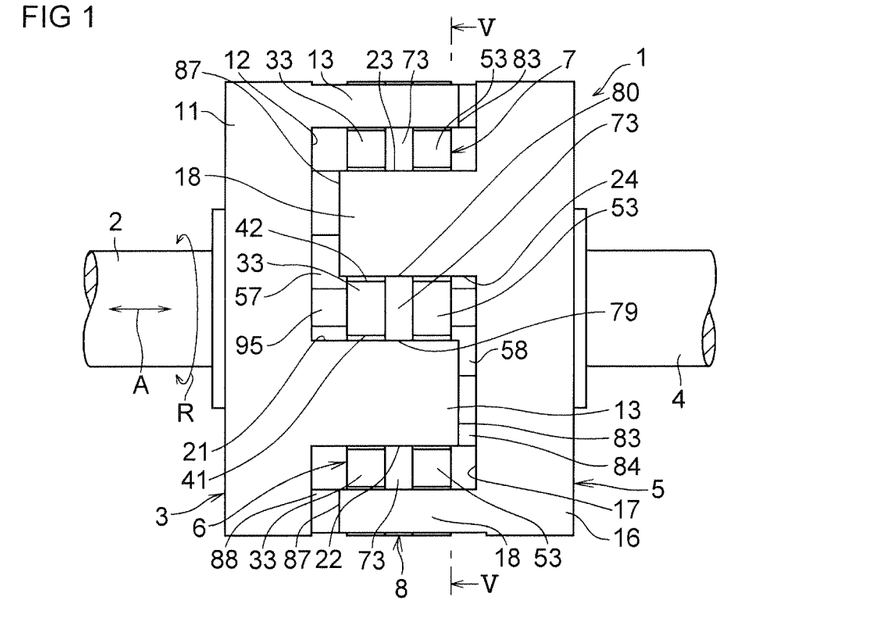
FIG. 1 is an explanatory front elevational view of a preferred embodiment of the invention.
Figure 2:
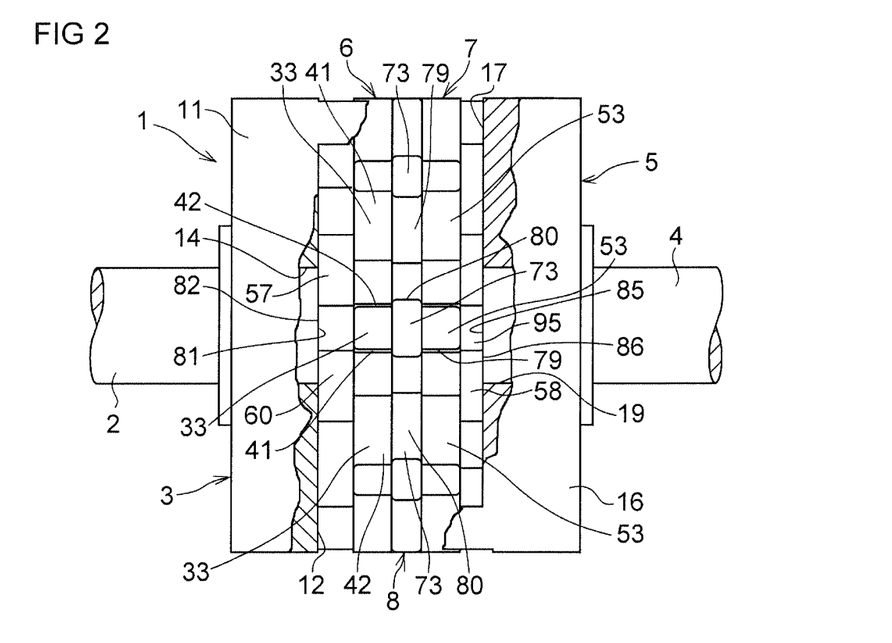
FIG. 2 is an explanatory partially cutaway front elevational view of the embodiment shown in FIG. 1.
Figure 3:
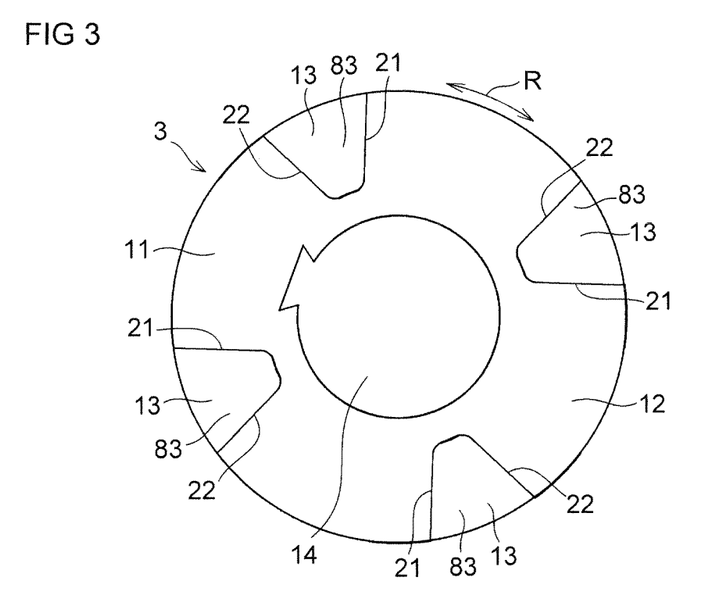
FIG. 3 is an explanatory side elevational view of a coupling base body on the side of the other rotating shaft in the embodiment shown in FIG. 1.

As particularly shown in FIG. 3, the coupling base body 3 which is rigid includes an annular base portion 11; two pairs of axial projecting portions 13 which project integrally from one annular surface 12 in an axial direction, i.e., an A direction, of the base portion 11 toward a base portion 16 of the coupling base body 5 in the A direction and are arranged at equiangular intervals of 90° in the direction about the axis, i.e., in the R direction; and a through hole 14 formed in the center of the base portion 11.

The rotating shaft 2 may be fitted and secured to the base portion 11 in the through hole 14 in which the rotating shaft 2 is inserted as in this embodiment. However, the rotating shaft 2 may be fitted and secured to the base portion 11 in a bottomed recess which is formed in the center of the base portion 11, or may, still alternately, be integrally formed with the base portion 11.

Figure 4:
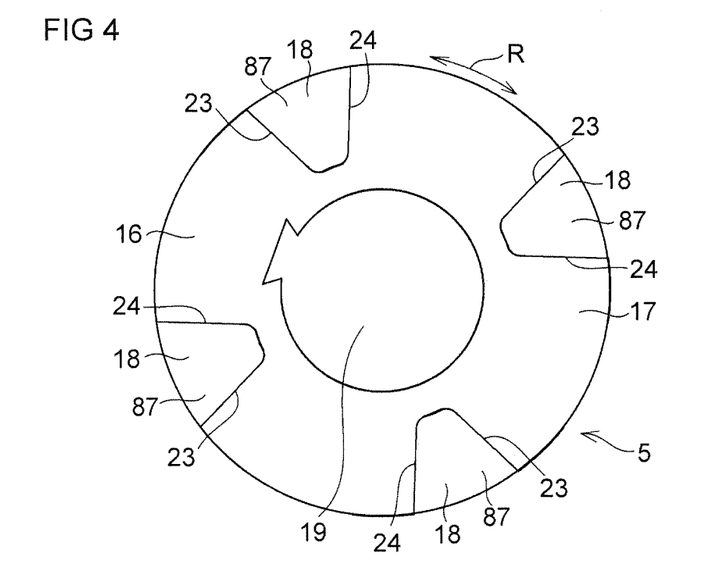
FIG. 4 is an explanatory side elevational view of a coupling base body on the side of one rotating shaft in the embodiment shown in FIG. 1.
Figure 5:
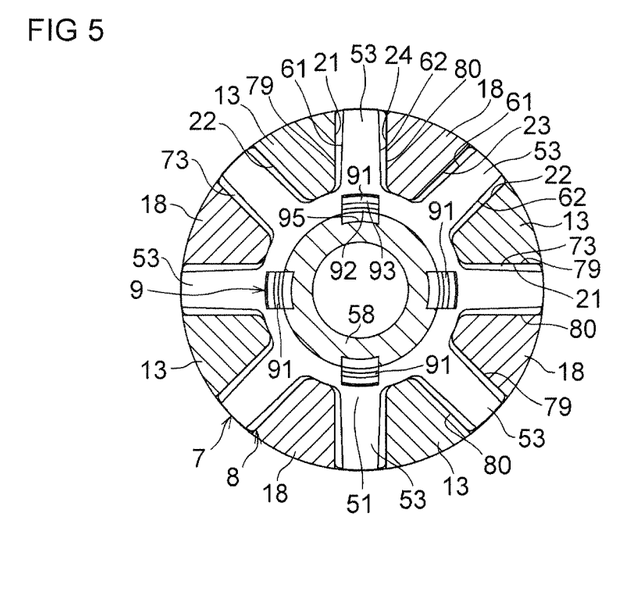
FIG. 5 is an explanatory cross-sectional view, taken in the direction of arrows along line V-V, of the embodiment shown in FIG. 1.
Figure 6:
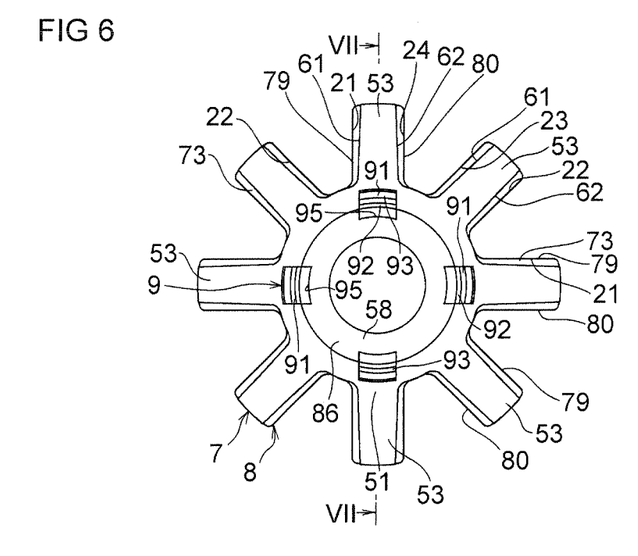
FIG. 6 is an explanatory side elevational view of a rotation transmitting body in the embodiment shown in FIG. 1.
Figure 7:
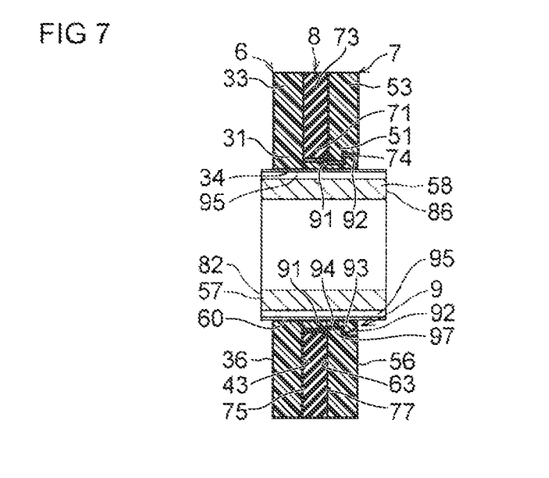
FIG. 7 is an explanatory cross-sectional view, taken in the direction of arrows along line VII-VII shown in FIG. 6.

As particularly shown in FIG. 4, the coupling base body 5 which is rigid includes the annular base portion 16; two pairs of axial projecting portions 18 which project integrally from one annular surface 17 in the A direction of the base portion 16 toward the base portion 11 of the coupling base body 3 in the A direction and are arranged at equiangular intervals of 90° in the R direction; and a through hole 19 formed in the center of the base portion 16.

The rotating shaft 4 may also be fitted and secured to the base portion 16 in the through hole 19 in which the rotating shaft 4 is inserted as in this embodiment. However, the rotating shaft 4 may be fitted and secured to the base portion 16 in a bottomed recess which is formed in the center of the base portion 16, or may, still alternately, be integrally formed with the base portion 16.

Each of the axial projecting portions 13 has in the R direction a pair of flat side surfaces 21 and 22 serving as rotation transmitting rigid surfaces, and each of the axial projecting portions 18 also has in the R direction a pair of flat side surfaces 23 and 24 serving as rotation transmitting rigid surfaces.

Figure 8:
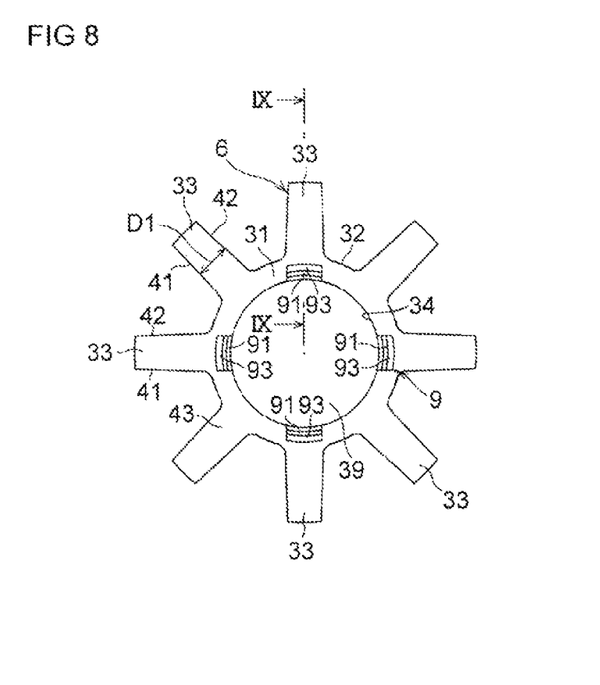
FIG. 8 is an explanatory side elevational view of one rotation transmitting member in the embodiment shown in FIG. 1.
Figure 9:
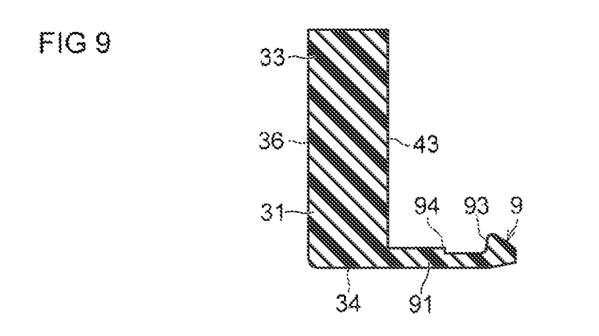
FIG. 9 is an explanatory enlarged cross-sectional view, taken in the direction of arrows along line IX-IX, of the one rotation transmitting member shown in FIG. 8.

As particularly shown in FIG. 8, the rigid rotation transmitting member 6, which is integrally formed of polyacetal resin, polyamide resin, or the like, includes an annular base portion 31 interposed between the base portions 11 and 16 in the A direction and disposed concentrically with the base portions 11 and 16; four pairs of radial projecting portions 33 which are formed integrally with the base portion 31 in such a manner as to project radially from a cylindrical outer peripheral edge 32 of the base portion 31 and are arranged in such a manner as to be spaced apart from each other at equiangular intervals of 45° in the R direction; and a circular through hole 39 defined by the cylindrical inner peripheral edge 34 of the base portion 31 and formed in the center of the base portion 31. The base portion 31 has one annular surface 36 in the A direction. Below-described pawl portions 91 are integrally formed on the rotation transmitting member 6.

Each of the radial projecting portions 33 has a pair of side surfaces 41 and 42 serving as rigid rotation transmitting surfaces in the R direction, and surfaces 43 of the radial projecting portions 33 opposing a surface 75 of the intermediate interposed member 8 are flush with each other and flat, preferably intermediately high in the R direction.

Figure 10:
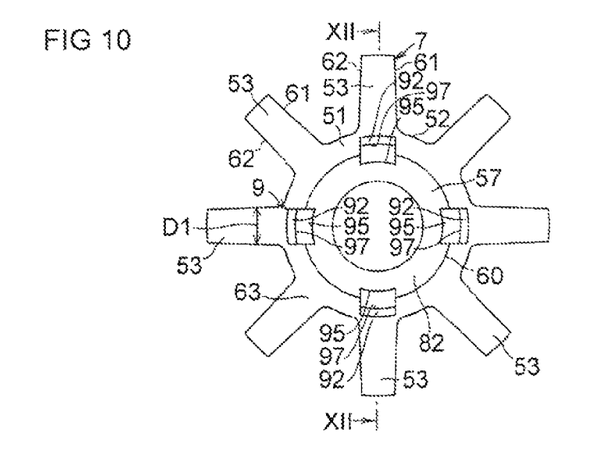
FIG. 10 is an explanatory side elevational view of the other rotation transmitting member in the embodiment shown in FIG. 1.
Figure 11:
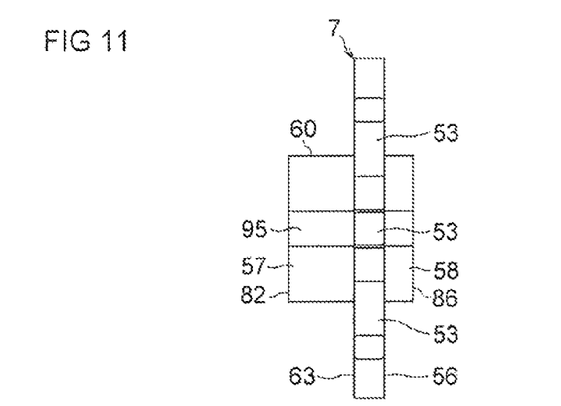
FIG. 11 is an explanatory front elevational view of the other rotation transmitting member shown in FIG. 10.
Figure 12:
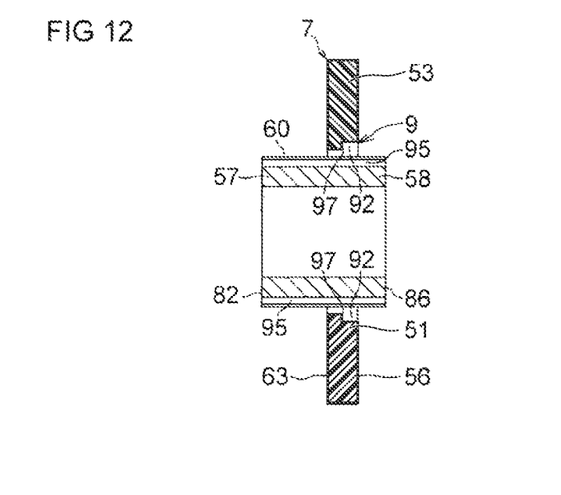
FIG. 12 is an explanatory cross-sectional view, taken in the direction of arrows along line XII-XII shown in FIG. 10.

As particularly shown in FIG. 10, the rigid rotation transmitting member 7, which is integrally formed of polyacetal resin, polyamide resin, or the like in the same way as the rotation transmitting member 6, includes an annular base portion 51 interposed between the base portions 11 and 16 in the A direction and disposed concentrically with the base portions 11 and 16; four pairs of radial projecting portions 53 which are formed integrally with the base portion 51 in such a manner as to extend radially from a cylindrical outer peripheral edge 52 of the base portion 51 and are arranged in such a manner as to be spaced apart from each other at equiangular intervals of 45° in the R direction; a cylindrical axial projection 57 formed integrally with the base portion 51 in such a manner as to project in the A direction from one annular surface 63 in the A direction of the base portion 51; and a cylindrical axial projection 58 formed integrally with the base portion 51 in such a manner as to project in the A direction from another surface 56 in the A direction of the base portion 51. Below-described coupling holes 92 are formed in the rotation transmitting member 7.

Each of the radial projecting portions 53 has a pair of side surfaces 61 and 62 serving as rigid rotation transmitting surfaces in the R direction, and surfaces 63 of the radial projecting portions 53 opposing a surface 77 of the intermediate interposed member 8 are flush with each other and flat, preferably intermediately high in the R direction.

The rotation transmitting member 6 and the rotation transmitting member 7 are arranged concentrically such that the base portion 31 and the base portion 51, as well as the respective radial projecting portions 33 and the respective radial projecting portions 53, face each other in the A direction with the intermediate interposed member 8 interposed therebetween.

The axial projection 57 is passed through the through hole 39 of the rigid rotation transmitting member 6 and a circular through hole 76 of the intermediate interposed member 8 so as to be disposed concentrically with the through holes 39 and 76, and an outer peripheral surface 60 of the axial projection 57 is in contact with the entire periphery of the inner peripheral edge 34 of the base portion 31 defining the through hole 39. The axial projection 57 has a flat annular surface 82 at its distal end in the A direction, while the axial projection 58 has a flat annular surface 86 at its distal end in the A direction. The axial projections 57 and 58 are of the same diameter, and form in cooperation with each other one hollow cylindrical portion extending in the A direction, this hollow cylindrical portion being disposed concentrically with the base portion 51. The axial projections 57 and 58 have mutually different heights in the A direction, and the axial projection 57 is higher than the axial projection 58 in the A direction. Below-described grooves 95 are formed in each of the axial projections 57 and 58.

The intermediate interposed member 8 has a smaller rigidity than the rotation transmitting members 6 and 7, is elastically deformable, and is formed of a rubber elastic body such as urethane rubber, polyester elastomer, or the like. As particularly shown in FIG. 13, the intermediate interposed member 8 includes a disk-shaped base portion 71 interposed between the base portions 31 and 51 in the A direction concentrically with the base portions 31 and 51; four pairs of radial projecting portions 73 which are formed integrally with the base portion 71 in such a manner as to extend radially from a cylindrical outer peripheral edge 72 of the base portion 71 and are arranged in such a manner as to be spaced apart from each other at equiangular intervals of 45° in the R direction; and the circular through hole 76 defined by a cylindrical inner peripheral edge 74 of the base portion 71 and formed in the center of the base portion 71. The intermediate interposed member 8 is disposed such that the base portion 71 and the radial projecting portions 73 are respectively sandwiched by the base portions 31 and 51 and by the radial projecting portions 33 and 53 in the A direction in close contact therewith. The base portion 71 has the one flat surface 75 in the A direction and the other flat surface 77 in the A direction. Below-described retaining projections 96 are formed on the intermediate interposed member 8.

Figure 13:
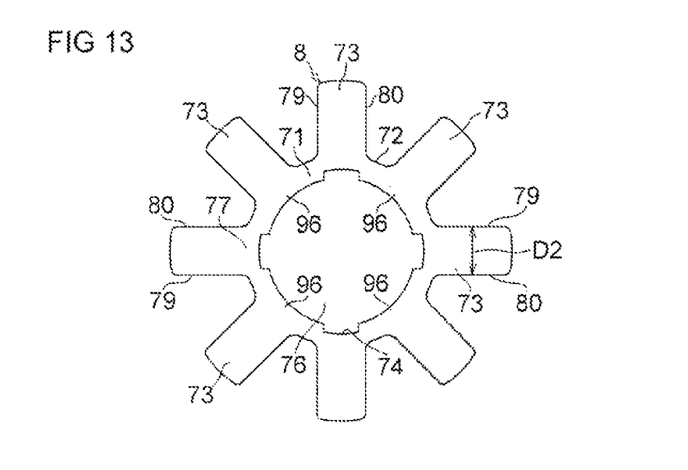
FIG. 13 is an explanatory side elevational view of an intermediate interposed member in the embodiment shown in FIG. 1.

Each of the radial projecting portions 73 of the intermediate interposed member 8 has a smaller rigidity than that of each of the radial projecting portions 33 and 53 of the rotation transmitting members 6 and 7, and is elastically deformable. Each of the radial projecting portions 73, which has side surfaces 79 and 80 in the R direction, is disposed between the corresponding radial projecting portions 33 and 53 of the rotation transmitting members 6 and 7 in the A direction in close contact therewith, and is formed with a larger width D2 in the R direction than a width D1 of each of the radial projecting portions 33 and 53.

The rotation transmitting members 6 and 7 and the intermediate interposed member 8 interposed between the rotation transmitting members 6 and 7 are arranged concentrically such that the base portions 31 and 51 and the base portion 71, as well as the respective radial projecting portions 33 and 53 and the respective radial projecting portions 73, face each other in the A direction in close contact therewith.

Each of the rotating shaft 2 and the base portion 11 of the coupling base body 3 is in contact with a surface 82 in the A direction of the axial projecting portion 57 at each of their surfaces 12 and 81 in the A direction. Each of the axial projecting portions 13 of the coupling base body 3 is disposed in every other gap between adjacent ones of the radial projecting portions 33 and 53 of the rotation transmitting members 6 and 7 in the R direction and in every other gap of adjacent ones of the radial projecting portions 73 of the intermediate interposed member 8 in the R direction, is in contact with both one side surface 79 in the R direction of one radial projecting portion 73 and the other side surface 80 in the R direction of another radial projecting portion 73 at its both side surfaces 21 and 22 in the R direction, extends across and beyond the surface 56 of the rotation transmitting member 7, and, at its distal end surface 83 in the A direction, opposes the surface 17 of the base portion 16 of the coupling base body 5 with a clearance 84 therebetween.

Each of the rotating shaft 4 and the base portion 16 of the coupling base body 5 is in contact with a surface 86 in the A direction of the axial projecting portion 58 at each of their surfaces 17 and 85 in the A direction. Each of the axial projecting portions 18 of the coupling base body 5 is disposed in every other remaining gap between adjacent ones of the radial projecting portions 33 and 53 of the rotation transmitting members 6 and 7 in the R direction and in every other remaining gap between adjacent ones of the radial projecting portions 73 of the intermediate interposed member 8 in the R direction, is in contact with both the other side surface 24 in the R direction of the one radial projecting portion 73 and the one side surface 79 in the R direction of the other radial projecting portion 73 at its both side surfaces 23 and 24 in the R direction, extends across and beyond the surface 36 of the rotation transmitting member 6, and, at its distal end surface 87 in the A direction, opposes the surface 12 of the base portion 11 of the coupling base body 3 with a clearance 88 therebetween.

The coupling means 9 has the four pawl portions 91 which are integrally provided on the base portion 31 in such a manner as to projectingly extend in the A direction from the inner peripheral edge 34 of the other surface 43 in the A direction of the base portion 31 toward the base portion 51; the four coupling holes 92 which are provided on the base portion 51 and into which the respective pawl portions 91 are inserted so as to be latched; the four grooves 95 which are formed on the outer peripheral surfaces of the axial projections 57 and 58 in such a manner as to extend in the A direction and partially define the respective coupling holes 92; and the four retaining projections 96 provided integrally on the base portion 71 in such a manner as to radially extend from the cylindrical inner peripheral edge 74 of the base portion 71.

The pawl portions 91 are arranged in such a manner as to be spaced apart from each other at equiangular angles of 90° in the R direction, and each have a hook portion 93 formed at its distal end and a stepped portion 94 formed at an interval in the A direction on the hook portion 93 in such a manner as to project radially. The pawl portion 91 is passed through adjacent ones of the retaining projections 96 and is latched at each coupling hole 92.

The coupling holes 92, which are circular-arc shaped, are arranged in such a manner as to be spaced apart from each other at equiangular angles of 90° in the R direction, and each have a latched projection 97 which projects radially inwardly and is latched in the A direction by the hook portion 93 formed on the base portion 31 and disposed in the coupling hole 92. As the latched projection 97 is disposed between the hook portion 93 and the stepped portion 94, the latched projection 97 is adapted to be latched by the hook portion 93 and to be engaged with the stepped portion 94.

The retaining projections 96 are arranged in such a manner as to be spaced apart from each other at equiangular angles of 90° in the R direction, and are respectively fitted in cavities which are partitioned by the pawl portions 91 of the coupling means 9 and the base portions 31 and 51. If the intermediate interposed member 8 is positioned with respect to the rotation transmitting members 6 and 7 by the pawl portions 91 as the retaining projections 96 are fitted in the cavities partitioned by the pawl portions 91 of the coupling means 9, it is possible to obtain the effect of the intermediate interposed member 8 uniformly with respect to the rotation of the two rotating shafts (the rotating shaft 4 and the rotating shaft 2) in the R direction in both directions.

The rotation transmitting members 6 and 7 are coupled to each other with the intermediate interposed member 8 sandwiched therebetween by means of the above-described coupling means 9. The rotation transmitting members 6 and 7, which are coupled to each other with the intermediate interposed member 8 sandwiched therebetween by means of the above-described coupling means 9, as well as the intermediate interposed member 8, form a rotation transmitting body as one assembly.

With respect to the intermediate interposed member 8 and the rotation transmitting members 6 and 7 coupled to each other with the intermediate interposed member 8 interposed therebetween by the coupling means 9, each of the axial projecting portions 13 of the coupling base body 3 is disposed in one gap between adjacent ones of the radial projecting portions 33 and 53 among the respective pairs of projecting portions 33 and 53 of the rotation transmitting members 6 and 7, i.e., in every other gap between adjacent ones of the radial projecting portions 33 and 53, as well as in one gap between adjacent ones of the radial projecting portions 73 among the respective pairs of projecting portions 73 of the intermediate interposed member 8, i.e., in every other gap between adjacent ones of the radial projecting portions 73, in the R direction. Meanwhile, each of the axial projecting portions 18 of the coupling base body 5 is disposed in another gap between adjacent ones of the radial projecting portions 33 and 53 among the respective pairs of projecting portions 33 and 53 of the rotation transmitting members 6 and 7, i.e., in every other remaining gap between adjacent ones of the radial projecting portions 33 and 53, as well as in another gap between adjacent ones of the radial projecting portions 73 among the respective pairs of projecting portions 73 of the intermediate interposed member 8, i.e., in every other remaining gap between adjacent ones of the radial projecting portions 73, in the R direction. In the relative rotation by a fixed degree or less in the R direction between the rotating shafts 2 and 4, each of the axial projecting portions 13 of the coupling base body 3 at its side surfaces 21 and 22 in the R direction is in contact with the side surfaces 79 and 80 in the R direction of each projecting portion 73 of the intermediate interposed member 8, but is in non-contact with the side surfaces 41 and 42 as well as 61 and 62 of the radial projecting portions 33 and 53 of the rotation transmitting members 6 and 7 opposing them in the R direction. Meanwhile, each of the axial projecting portions 18 of the coupling base body 5 at its side surfaces 23 and 24 in the R direction is in contact with the side surfaces 79 and 80 in the R direction of each projecting portion 73 of the intermediate interposed member 8, but is in non-contact with the side surfaces 41 and 42 as well as 61 and 62 of the radial projecting portions 33 and 53 of the rotation transmitting members 6 and 7 opposing them in the R direction.

With the toe control actuator having the shaft coupling mechanism 1 for mutually coupling the above-described two rotating shafts, i.e., the rotating shafts 2 and 4, the rotating shaft 2 is rotated in the R direction by the operation of an electric motor through a reduction gear, and the rotation of the coupling base body 3 in the R direction is transmitted to the axial projecting portions 18 of the coupling base body 5 through the pressing in the R direction against the radial projecting portions 33 and 53 by the axial projecting portions 13 on the basis of the contact of the side surfaces 21 with the side surfaces 41 and 61 or the contact of the side surfaces 22 with the side surfaces 42 and 62 after the elastic deformation in the R direction of the radial projecting portions 73 by the axial projecting portions 13, whereby the external thread member and the internal thread member of the feed screw mechanism is caused to undergo relative rotation by adding the rotational force of the rotating shaft 4 in the R direction to the rotation of the rotating shaft 2 in the R direction, to thereby allow the toe control actuator to be expanded and contracted in order to adjust the toe angle.

With the shaft coupling mechanism 1 which couples the rotating shafts 2 and 4 by being disposed between the rotating shafts 2 and 4 so as to transmit the rotation of the rotating shaft 2 in the R direction to the rotating shaft 4 which is the other rotating shaft, in both the state in which the electric motor is not operated and the rotating shaft 2 is not rotated in the R direction and the state in which the electric motor is operated and the rotating shaft 2 is rotated in the R direction, in a case where the relative rotation of the rotating shaft 4 in the R direction with respect to the rotating shaft 2 is of such a very small degree as to fall within less than about half a difference between the width D2 and the width D1, the radial projecting portions 73 easily undergo compressive deformation. As a result, such a very small relative rotation of the rotating shaft 2 in the R direction is not transmitted to the rotating shaft 4, while a very small relative rotation of the rotating shaft 4 in the R direction is not transmitted to the rotating shaft 2. Thus, it is possible to reduce the transmission of the impact at the time of the reversing of the electric motor and the brush vibration through the shaft coupling mechanism 1 and the rotating shaft 4 to the knuckle side of the vehicle suspension and/or the vehicle body side of the automobile. Moreover, after the compressive deformation of the radial projecting portions 73 by more than a fixed degree, the contact of the side surfaces 21 with the side surfaces 41 and 61 or the contact of the side surfaces 22 with the side surfaces 42 and 62 occur, which makes it possible to suppress any further elastic compressive deformation of the radial projecting portions 73. As a result, it is possible to prevent the permanent set of the radial projecting portions 73 due to their creep. Hence, it is possible to maintain over extended periods of time the mutual contact between, on the one hand, the side surfaces 21 and 22 as well as 23 and 24 and, on the other hand, the side surfaces 79 and 80 in the R direction of the axial projecting portions 13 and 18 and the radial projecting portions 73, and therefore backlash is made difficult to occur between the rotating shaft 4 and the rotating shaft 2 in the R direction.

Further, in cases where the rotating shaft 2 is rotated in the R direction by the operation of the electric motor, and the rotating shaft 2 tends to be relatively rotated in the R direction with respect to the rotating shaft 4 by more than a fixed degree, i.e., by more than about a half the difference between the width D2 and the width D1, the rotation transmitting members 6 and 7 transmit the rotation of the rotating shaft 2 in the R direction to the rotating shaft 4 in response to such relative rotation in the R direction by more than a fixed degree through the pressing against the radial projecting portions 33 and 53 by the axial projecting portions 13 in the R direction on the basis of the contact of the side surfaces 21 with the side surfaces 41 and 61 or the contact of the side surfaces 22 with the side surfaces 42 and 62.

According to the above-described shaft coupling mechanism 1 in accordance with this embodiment, each of the rotating shaft 2 and the base portion 11 of the coupling base body 3 is in contact with the surface 82 in the A direction of the axial projecting portion 57 at each of their surfaces 12 and 81 in the A direction which are arranged flush with each other. Each of the rotating shaft 4 and the base portion 16 of the coupling base body 5 is in contact with the surface 86 in the A direction of the axial projecting portion 58 at each of their surfaces 17 and 85 in the A direction which are arranged flush with each other. Each of the axial projecting portions 13 of the coupling base body 3 extends across and beyond the surface 56 of the rotation transmitting member 7, and, at its distal end surface 83 in the A direction, opposes the surface 17 of the base portion 16 of the coupling base body 5 with the clearance 84 therebetween. Each of the axial projecting portions 18 of the coupling base body 5 extends across and beyond the surface 36 of the rotation transmitting member 6, and, at its distal end surface 87 in the A direction, opposes the surface 12 of the base portion 11 of the coupling base body 3 with the clearance 88 therebetween. Therefore, it is possible to avoid contact between, on the one hand, the distal end surfaces 83 of the axial projecting portions 13 of the coupling base body 3 and, on the other hand, the surface 17 of the base portion 16 of the coupling base body 5 and contact between, on the one hand, the distal end surfaces 87 of the axial projecting portions 18 of the coupling base body 5 and, on the other hand, the surface 12 of the base portion 11 of the coupling base body 3. Furthermore, it is possible to allow the axial projecting portions 13 and 18 of the coupling base bodies 3 and 5 to be brought into contact with overall surfaces in the R direction of the radial projecting portions 33 and 53 of the rotation transmitting members 6 and 7. Additionally, it is possible to eliminate the occurrence of collision noise in the relative displacement in the A direction of the rotating shaft 2 with respect to the rotating shaft 4, and unpleasant frictional noise is not generated in the transmission of the rotation in the R direction of the rotating shaft 2 to the rotating shaft 4. Furthermore, it is possible to secure, as desired, the contact area in the R direction of each of the axial projecting portions 13 and 18 of the coupling base bodies 3 and 5 with respect to the radial projecting portions 33 and 53 of the rotation transmitting members 6 and 7, and to avoid excessive elastic compressive deformation of the intermediate interposed member 8, thereby making it possible to improve the durability.

According to the shaft coupling mechanism 1, the intermediate interposed member 8 interposed between the rotation transmitting members 6 and 7 in the A direction has the radial projecting portions 73 which are respectively disposed between the radial projecting portions 33 and 53 of the rotation transmitting members 6 and 7 in the A direction and each have the greater width D2 than the width D1 in the R direction of each of the radial projecting portions 33 and 53, and each radial projecting portion 73 of the intermediate interposed member 8 has a smaller rigidity than the rigidity of each of the radial projecting portions 33 and 53 of the rotation transmitting members 6 and 7. In consequence, the transmission of the rotation of the rotating shaft 2 in the R direction to the rotating shaft 4 is effected through the elastic deformation of the radial projecting portions 73 of the intermediate interposed member 8, so that the transmission of a very small degree of rotation of the rotating shaft 2 in the R direction to the rotating shaft 4 can be prevented by the elastic deformation of the radial projecting portions 73 of the intermediate interposed member 8. Meanwhile, the transmission to the rotating shaft 4 of a large degree of relative rotation of the rotating shaft 2 in the R direction with respect to the rotating shaft 4 can be effected as it is through the radial projecting portions 33 and 53 of the rotation transmitting members 6 and 7 having greater rigidity than the radial projecting portions 73 of the intermediate interposed member 8. Moreover, in the relative rotation of the rotating shaft 2 by more than a fixed degree in the R direction with respect to the rotating shaft 4, large elastic deformation of the radial projecting portions 73 of the intermediate interposed member 8 can be prevented by the radial projecting portions 33 and 53 of the rotation transmitting members 6 and 7 having greater rigidity; therefore, even if a pliable resin material having a small rigidity is used for the intermediate interposed member 8, permanent set of the intermediate interposed member 8 due to creep can be reduced. Moreover, since the pair of rotation transmitting members 6 and 7 are coupled to each other through the coupling means 9, it is possible to improve assembling efficiency, and the mutual separation of the pair of rotation transmitting members 6 and 7 in the A direction due to the elastic deformation of the intermediate interposed member 8 can be eliminated, making it possible to suppress the pair of rotation transmitting members 6 and 7 from spreading in the A direction by more than a fixed extent. Thus, it is possible to reduce the transmission of the impact at the time of the reversing of the electric motor and the brush vibration to the knuckle side of the vehicle suspension and/or the vehicle body side of the automobile, and eliminate backlash between the rotating shafts 2 and 4 in the R direction, thereby making it possible to prevent the steering feel from becoming uncomfortable and obtain excellent durability and stable characteristics.

In addition, according to the shaft coupling mechanism 1, since the outer peripheral surface 60 of the axial projecting portion 57 is in contact with the respective inner peripheral edges 34 and 74 of the base portions 31 and 71 defining the first and second through holes 39 and 76, it is possible to inhibit the relative displacement of the pair of rotation transmitting members 6 and 7 in a direction perpendicular to the A direction, so that it is possible to reliably prevent the positional offset between the rotational axis of the rotating shaft 4 and the rotational axis of the rotating shaft 2, thereby making it possible to eliminate the possibility of a decline in the rotation transmission efficiency.

It should be noted that the numbers of the axial projecting portions 13 and 18 of the coupling base bodies 3 and 5, the radial projecting portions 33 and 53 of the rotation transmitting members 6 and 7, the radial projecting portions 73 of the intermediate interposed member 8, and the pawl portions 91 and the coupling holes 92 of the coupling means 9 are not limited to the aforementioned numbers. The surface 12 of the base portion 11 and the surface 81 of the rotating shaft 2 may not be flush with each other, and the surface 17 of the base portion 16 and the surface 85 of the rotating shaft 4 may similarly not be flush with each other.

DESCRIPTION OF REFERENCE NUMERALS

1: shaft coupling mechanism
2, 4: rotating shaft
3: coupling base body
5: coupling base body
6, 7: rotation transmitting member
8: intermediate interposed member

The invention claimed is:

1. A shaft coupling mechanism for coupling two rotating shafts by being disposed between the two rotating shafts so as to transmit the rotation of one rotating shaft to the other rotating shaft, comprising: one coupling base body which is coupled to one rotating shaft; another coupling base body which is coupled to another rotating shaft; a pair of rotation transmitting members which are disposed between said one and said other coupling base bodies; and an intermediate interposed member which is interposed between said pair of rotation transmitting members, wherein each of said one and said other coupling base bodies has a first base portion and a first axial projecting portion formed integrally with the first base portion in such a manner as to project in an axial direction from one axial surface of the first base portion, the first axial projecting portion of said one coupling base body and the first axial projecting portion of said other coupling base body being disposed with an interval therebetween in a direction about an axis, wherein one of said pair of rotation transmitting members has a second base portion interposed between the first base portions of said one and said other coupling base bodies in the axial direction, at least a pair of first radial projecting portions formed integrally on the second base portion in such a manner as to be spaced apart from each other in the direction about the axis and project radially from an outer peripheral edge of the second base portion, and a first through hole formed in a center of the second base portion, while the other one of said pair of rotation transmitting members has a third base portion interposed between the first base portions of said one and said other coupling base bodies in the axial direction, at least a pair of second radial projecting portions formed integrally on the third base portion in such a manner as to be spaced apart from each other in the direction about the axis and project radially from an outer peripheral edge of the third base portion, and in such a manner as to face the pair of first radial projecting portions in the axial direction, a second axial projecting portion formed integrally on the third base portion in such a manner as to project in the axial direction from one axial surface of the third base portion, and a third axial projecting portion formed integrally on the third base portion in such a manner as to project in the axial direction from another axial surface of the third base portion, wherein said intermediate interposed member has a fourth base portion interposed between the second base portion and the third base portion in the axial direction, a pair of third radial projecting portions which are integrally formed on the fourth base portion in such a manner as to project radially from an outer peripheral edge of the fourth base portion and to be spaced apart from each other in the direction about the axis, are each disposed between the pair of first radial projecting portions and the pair of second radial projecting portions in the axial direction, and each have a greater width in the direction about the axis than a width of each of the pair of first radial projecting portions and the pair of second radial projecting portions, and a second through hole formed in a center of the fourth base portion, wherein each of the pair of third radial projecting portions has a smaller rigidity than the rigidity of the first axial projecting portion and the first and second radial projecting portions and is elastically deformable, and at least one of the one rotating shaft and the first base portion of said one coupling base body is in contact at its one axial surface with an axial surface of the second axial projecting portion, while at least one of the other rotating shaft and the first base portion of said other coupling base body is in contact at its one axial surface with an axial surface of the third axial projecting portion, wherein the first axial projecting portion of said one coupling base body is disposed in one third radial projecting portion gap in the direction about the axis, is, at its both side surfaces in the direction about the axis, in contact with both one side surface in the direction about the axis of one third radial projecting portion and another side surface in the direction about the axis of another third radial projecting portion, extends across and beyond one axial surface of said other rotation transmitting member, and, at its axial distal end surface, opposes the one axial surface of the first base portion of said other coupling base body with a clearance therebetween, while the first axial projecting portion of said other coupling base body is disposed in another third radial projecting portion gap in the direction about the axis, is, at its both side surfaces in the direction about the axis, in contact with both another side surface in the direction about the axis of the one third radial projecting portion and one side surface in the direction about the axis of the other third radial projecting portion, extends across and beyond one axial surface of said one rotation transmitting member, and, at its axial distal end surface, opposes the one axial surface of the first base portion of said one coupling base body with a clearance therebetween, and wherein the second axial projecting portion is passed through the first and second through holes, and an outer peripheral surface of the second axial projecting portion is in contact with an inner peripheral edge of the second base portion defining the first through hole.

2. The shaft coupling mechanism according to claim 1, further comprising coupling means for coupling said pair of rotation transmitting members to each other, and said coupling means has a pawl portion which is integrally provided on the second base portion in such a manner as to projectingly extend from an inner peripheral edge of another axial surface of the second base portion toward the third base portion and a coupling hole which is provided on the third base portion and into which the pawl portion is inserted so as to be latched at its distal end by the third base portion.

\* \* \* \* \*